July 11, 1933.  R. TRÖGER  1,918,066
SYSTEM OF DISTRIBUTION
Filed March 22, 1932
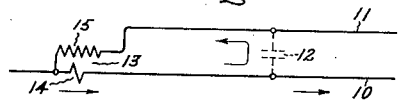
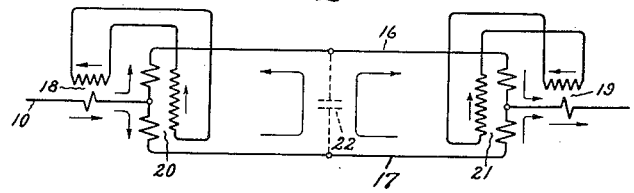
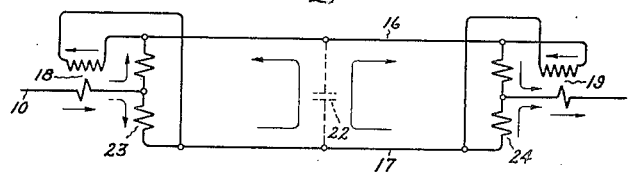
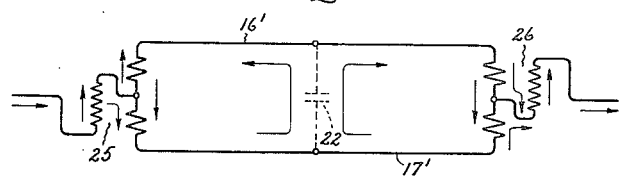
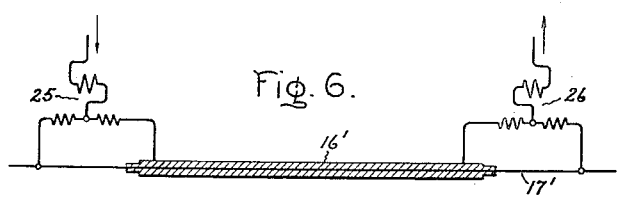
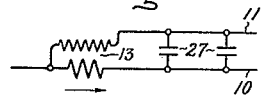
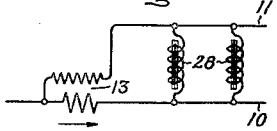
Inventor:
Richard Tröger,
by Charles E. Tulla
His Attorney.

Patented July 11, 1933

1,918,066

UNITED STATES PATENT OFFICE

RICHARD TRÖGER, OF BERLIN-ZEHLENDORF, GERMANY, ASSIGNOR TO GENERAL ELECTRIC COMPANY, A CORPORATION OF NEW YORK

SYSTEM OF DISTRIBUTION

Application filed March 22, 1932, Serial No. 600,419, and in Germany March 21, 1931.

My invention relates to systems of distribution and more particularly to systems of distribution for transmitting alternating current electric power at high voltage over long distances.

In the transmission of alternating current power the usual transmitting circuit possesses inherent disadvantages due to the effect of the inductance of the lines, causing voltage changes detrimental to the operation of alternating current apparatus in general, and in power transmission systems causing instability of operation of synchronous machines between which power is to be transmitted.

The usual method of compensating for the effects of inductance consists in employing some reactive current means in parallel to the line but this method requires constant regulation when the load varies because the inductive line loss is proportional to variations in load. Some of the disadvantages of parallel compensation have been overcome by the use of capacitance devices, such as capacitors, connected in series relation with the line or by line construction wherein a series capacitance effect is obtained in the line, as described and claimed in United States Letters Patent No. 1,825,624 granted upon an application of Clifford A. Nickle and assigned to the assignee of the present application.

It is an object of my invention to provide an improved arrangement for compensating the effects of inductance in an alternating current circuit or transmission system in which capacitors are totally or partially dispensed with and the properties of the line are used to provide the series capacitance effect.

In accordance with my invention, the additional capacitance is produced in the lines by dividing the current conductor into two or more sections and by applying a difference of potential between these sectional conductors through the secondary winding of a series transformer connected in the main circuit and having the difference of potential proportional to the amount of current flowing through the line.

My invention will be better understood by reference to the following description taken in connection with the accompanying drawing and its scope will be pointed out in the appended claims.

In the drawing, Fig. 1 is a simplified diagrammatic illustration of one embodiment of my invention utilizing an auxiliary conductor disposed in capacitive relation with the main conductor, Fig. 2 is a modification of the arrangement illustrated in Fig. 1 adapted for use with sheathed cable conductors; Figs. 3, 4 and 5 are simplified diagrammatic arrangements illustrating embodiments of my invention wherein the current conductor is divided into parallel connected sections in substantially parallel spaced relation; Fig. 6 is a modification of the arrangements illustrated in Figs. 3, 4 and 5 adapted for sheathed cable conductors, and Figs. 7 and 8 diagrammatically illustrate modifications of the foregoing arrangements wherein additional capacitors and inductive reactance devices are employed.

Referring to Fig. 1, which illustrates a simple embodiment of my invention, 10 represents the main conductor of an alternating circuit having an additional wire 11 arranged in substantially parallel spaced relation therewith. A difference of potential is impressed between the main conductor 10 and additional conductor 11 by means of a transformer 13 having a primary winding 14 connected in series with the main conductor and a secondary winding 15 connected in series with the additional conductor 11. The conductor 11 is connected to the main conductor 10 through the secondary winding 14 of the transformer 13. The primary as well as the secondary voltage of the series transformer 13 is proportional to the amount of current flowing through conductor 10 so that the capacitance between conductors 10 and 11 acts as if an equivalent capacitor were directly connected in the main line. The arrows indicate the relative current flow in the respective circuits. The transformer ratio must of course be taken into consideration when making the necessary calculations in regard to the capacitance effect desired. Compensation is thus obtained for all load conditions without the necessity of varying the operating voltage or of regulating the compensating means.

Fig. 2 shows a modification of the arrangement illustrated in Fig. 1 as applied to sheathed cables. In this case the conductor 10' is formed by the inner conductor of the cable and the additional wire 11' is formed by the cable sheath. The primary winding 14 of transformer 13 is connected in series relation with the conductor 10' and the secondary winding 15 is connected to a point in conductor 10' and to the sheath 11'. Since the capacity of cables is greater than that of overhead lines smaller differences of potential and shorter lengths may be employed than for conductors in air with an air dielectric.

The embodiments of my invention illustrated in Figs. 3 to 6 inclusive apply to arrangements in which sections of the conductor are parallel connected and are all used for conducting the load current so that extra line material necessitated by the auxiliary conducting element, such as wire 11, is dispensed with.

With reference to Fig. 3, the main conductor 10 is divided into two or more sectional conductors 16 and 17 over the length of the line or a given portion thereof and are united again at the end of the line or section to form parallel-connected conductors. Two transformers 18 and 19 are connected in series with conductor 10 at the respective ends of the line or section. Transformers 20 and 21 are also employed at each of the lines or sections and each is provided with an electrical mid-tap. The primary winding of series transformer 18 is connected to the mid-tap of transformer 20 and the primary winding of transformer 19 is connected to the mid-tap of transformer 21. The conductors 16 and 17 are connected respectively to the free terminals of transformers 20 and 21. The secondary windings of transformers 18 and 20 and transformers 19 and 21 are connected in series so that the voltage between divided conductors 16 and 17 is in the same direction in both cases. In this arrangement two currents are superimposed one upon the other in the conductors 16 and 17, i.e., first, the effective current of the conductor 10 which can flow unimpeded through the primary windings of transformers 20 and 21 because the ampere turns in both halves of said windings are in opposition and therefore cancel each other; second, the arrow-indicated charging current for the capacitance 22 shown in dotted lines is applied by transformation to the primary windings of transformers 18 and 19, whereby the compensation of the line is effected. It is thus possible to obtain the required capacity current by giving the divided conductors a suitable spacing and diameter and by making the transformation ratio of the transformers for the purpose of partially, fully, or over-compensating the inductive reactance of the line.

It may be sufficient in many instances to provide the transformer arrangement at one point only, in which case for example, the transformers 19 and 21 may be omitted.

The arrangement of circuits of Fig. 4 is similar to that of Fig. 3, but the transformers 20 and 21 are replaced by mid-tapped reactors 23 and 24, respectively. In this case the secondary windings of transformers 18 and 19 are connected at their respective ends of the split conductor section directly across the sectional conductors 16 and 17.

Fig. 5 shows a still more simplified arrangement in which only one series transformer in the form of an auto-transformer is necessary at each compensation point. At the entrance point of the split conductor section a transformer 25 is arranged with the primary winding connected to a tapped point in the secondary winding. A transformer 26 is similarly arranged at the exit end of the split-conductor section. In case it is sufficient to employ a transformer at one point only, the transformer 26 may be omitted and a simple tapped reactor may be used as the exit end.

Fig. 6 shows the modification illustrated in Fig. 5 as applied to a sheathed cable wherein the lead sheath 16' and conductor 17' are equivalent to the divided conductor of the previous examples and the sheath is utilized to conduct load current.

The capacitance effect of the divided conductors may of course be intensified by providing additional intermediate condensers in any of the illustrated embodiments in the manner illustrated in Fig. 7 wherein capacitors 27 are connected between the divided conductors 10 and 11. Conversely, the capacitance effect may be diminished by the interposition of inductive reactance devices between the split conductors in the manner illustrated in Fig. 8 wherein inductance coils 28 are connected between the divided conductors 10 and 11. The degree of compensation may thereby be varied without affecting its self-regulation relatively to load current variations. This may be desirable for example when in one part of the power system over-compensation is necessary at peak load and under-compensation at base load in order to narrow the limits of voltage variations in adjacent line sections which are not compensated or only incompletely compensated.

In order to avoid unduly high stresses in the transformers and unduly high voltages between the divided conductors or between main and auxiliary conductors, the transformers in each or any one of the illustrated embodiments are arranged to saturate for line currents above the normal load current whereby the rise in voltage may be limited upon the occurrence of overload or short circuit conditions.

While I have shown and described particular embodiments of my invention it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In a system of distribution, a transmitting circuit comprising a line conductor including a plurality of current conducting elements arranged in substantially parallel spaced relation, and means connected to be responsive to the current traversing said line conductor for establishing a difference of potential between said current conducting elements.

2. In a system of distribution, a transmitting circuit comprising a line conductor including a plurality of current conducting elements arranged in substantially parallel spaced relation, and transforming means interconnecting said current conducting elements for establishing a difference of potential between the respective conducting elements in accordance with the current traversing said line conductor.

3. In a system of distribution, a transmitting circuit including a main conductor, an auxiliary current conducting element arranged in substantially parallel spaced relation with said main conductor, and transforming means connected in series relation with said main conductor for establishing a difference of potential between said main conductor and said auxiliary conductor in accordance with the current traversing said main conductor.

4. In a system of distribution, a transmitting circuit including a line conductor divided into a plurality of parallel-connected sections arranged in substantially parallel spaced relation, and means connected to be responsive to the current traversing said line conductor for establishing a difference of potential between said sections.

5. In a system of distribution, a transmitting circuit including a line conductor divided into a plurality of parallel-connected sections arranged in substantially parallel spaced relation, and transforming means connected in series relation with said line conductor for establishing a difference of potential between said sections.

6. In a system of distribution, a transmitting circuit including a line conductor divided into a plurality of parallel-connected sections arranged in substantially parallel spaced relation, a transformer connected in series relation with said line conductor in the undivided portion of said transmitting circuit, a second transformer having a primary winding provided with an electrical mid-tap and having said mid-tap connected to one terminal of said first mentioned transformer and the remaining free terminals connected respectively to different sections of said divided line conductor, said transformers being provided with secondary windings connected in series relation.

7. In a system of distribution, a transmitting circuit including a line conductor divided into a plurality of parallel-connected sections arranged in substantially parallel spaced relation, a transformer connected in series relation with said line conductor in the undivided portion of said transmitting circuit, a reactor provided with an electrical mid-tap and having said mid-tap connected to one terminal of said transformer and the remaining free terminals connected respectively to different sections of said divided line conductor, said transformer being provided with a secondary winding and connected across the free terminals of said reactor.

8. In a system of distribution, a transmitting circuit including a line conductor divided into a plurality of parallel-connected sections arranged in substantially parallel spaced relation, and a transformer having a primary winding connected in series relation with said line conductor in the undivided portion of said transmitting circuit and a secondary winding provided with a mid-tap connected to one terminal of said primary winding and having the remaining free terminals connected to different sections of said divided line conductor.

9. In a system of distribution, a transmitting circuit comprising a line conductor including a plurality of current conducting elements arranged in substantially parallel spaced relation, and transforming means interconnecting said conducting elements for establishing a difference of potential between the respective conducting elements in accordance with the current traversing said line conductor, said transformer means being arranged to saturate for current values in said line conductor above a predetermined amount.

In witness whereof, I have hereunto set my hand.

RICHARD TRÖGER.